INVENTOR.
WELKER W. FUNK

April 25, 1967 W. W. FUNK 3,315,894
SPRAYER HAVING ADJUSTABLE LONG AND SHORT VANES
IN LONGITUDINAL ALIGNMENT
Filed Feb. 9, 1965 2 Sheets-Sheet 2
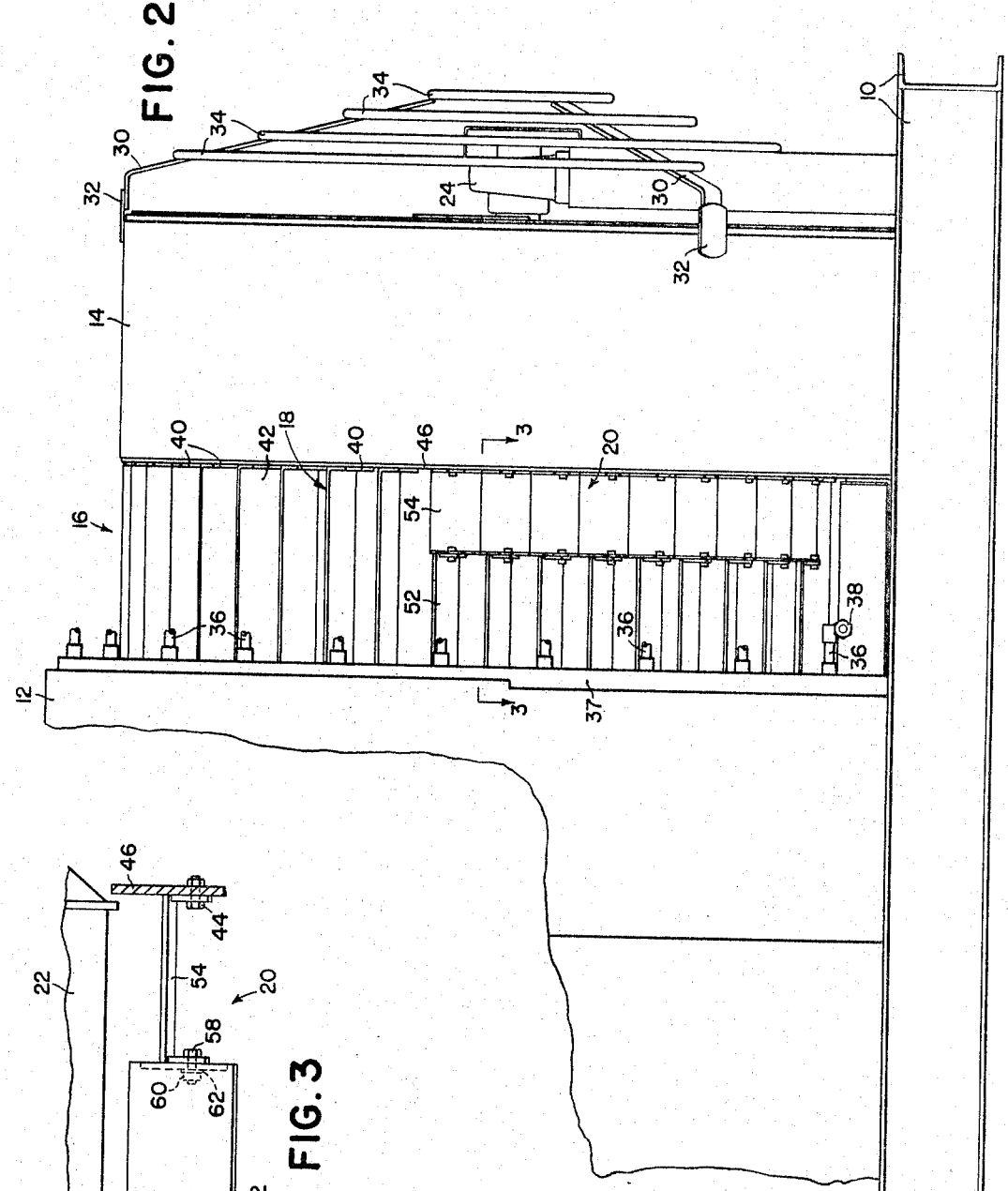
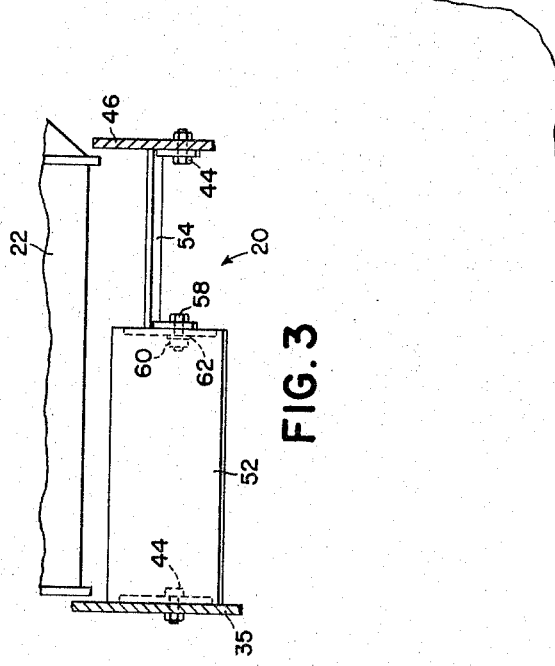
INVENTOR.
WELKER W. FUNK
BY
*John C. Thompson*
ATTORNEY United States Patent Office 3,315,894
Patented Apr. 25, 1967

3,315,894
SPRAYER HAVING ADJUSTABLE LONG AND SHORT VANES IN LONGITUDINAL ALIGNMENT
Welker W. Funk, Moline, Ill., assignor to Deere & Company, Moline, Ill., a corporation of Delaware
Filed Feb. 9, 1965, Ser. No. 431,297
3 Claims. (Cl. 239—78)

This invention relates generally to agricultural equipment and more particularly to air blast sprayers of the type adapted to be propelled past plants to be treated, said sprayers having means to create a blast of air into which spray material may be entrained.

Conventional air blast sprayers of today include a generally cylindrical housing which is adapted to be propelled past plants to be treated. Mounted within the housing is a propeller or blower which is rotated to generate a blast of air that is discharged through a peripheral opening in the housing.

It is the object of this invention to provide means disposable within the opening for controlling the air blast in a novel manner.

A further object of the present invention is to provide in the opening adjustable vanes which can be adjusted to close off a portion of the opening while the air blast emitting from another portion may be adjusted upwardly or downwardly.

These and other objects and advantages of the present invention will be apparent to one skilled in the art after a consideration of the following description taken in conjunction with the accompanying drawings in which the preferred form of the present invention is illustrated.

FIG. 2 is a side view of a portion of the sprayer illustrated in FIG. 1.

FIG. 3 is an enlarged view of applicant's novel vane structure taken along the lines 3—3 in FIG. 2.

Figure 1:
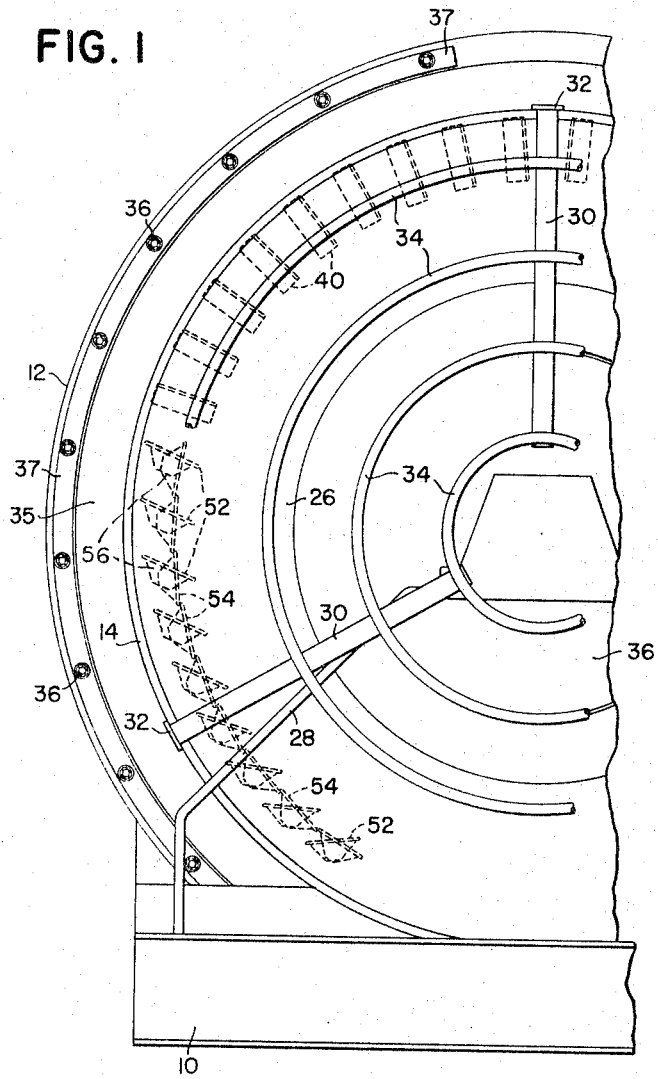
FIG. 1 is a rear view of a portion of a sprayer in which the principles of the present invention are incorporated.

In the following description right-hand and left-hand reference is determined by standing to the rear of the air blast sprayer and facing the direction of travel.

The sprayer of the present invention, as best shown in FIGS. 1 and 2, comprises a frame 10 upon which is mounted a generally cylindrical housing having a forward portion 12 and a rear portion 14. Disposed between the forward and rear portions of the housing, 12 and 14, respectively, is an opening indicated generally at 16. Disposed within the opening are a plurality of vanes which are preferably arranged into an upper set 18 and a lower set 20.

Mounted within the rear portion of the housing 14 is a blower or fan indicated at 22 in FIG. 3. The blower is rotatably mounted upon bearing blocks 24 (only the rear bearing block being shown) and is caused to be rotated to draw air in through the inlet cone 26 in the rear of the machine, the air being expelled through the opening 16. The bearing block is mounted upon a support 28 which is in turn secured at its lower end to the frame 10. Disposed over the opening to the inlet cone 26 is a guard having radially extending members 30 which are secured at their outer ends by a link 32 to the outer surface of the rear portion of the housing 14. Mounted upon the members 30 are concentric rings 34.

Mounted upon the rear surface 35 of the forward portion 12 of the housing are right- and left-hand pipes 37, each of which carries a plurality of stub spray pipes 36 which in turn carry at their rear end nozzles 38 that are adapted to spray material into the air stream being discharged through the opening 16 for entrainment therein. The spray pipes 37 receive spray material preferably from a tank mounted within a forward portion of the housing 12. The foregoing sprayer is not novel per se and a sprayer of generally similar construction is illustrated in U.S. Patent 3,246,846 issued Apr. 19, 1966, to Funk et al.

According to the principles of this invention a simplified vane construction is employed through which considerable control of the spray pattern may be achieved. To this end an upper set of vanes 18 is contemplated in which individual vanes extending the full width of the opening 16 are employed. Each of the upper vanes is U-shaped having generally rectangular end portions 40 disposed at either end of a central generally rectangular portion 42. The ends 40 are adjustably secured to at least one of the forward and rear walls 46, 35 by means of cap screws 44 which are secured within threaded apertures (no number) spaced equally apart in the forward and rear walls 46, 35. The upper vanes can be individually adjusted by merely loosening the cap screws at either end and positioning the vane in the desired manner and retightening the cap screws. The width of the central portions 42 is equal to or greater than the distance between the apertures so that the vanes will close the opening when fully turned. Thus, it is possible to close off either upper side if it is desired.

The vanes of the lower set 20 include a large vane 52 and a short vane 54. The large vane 52 may be disposed forwardly of the short vane 54 as shown in FIGS. 2 and 3 or the short vane 54 may be disposed forwardly of the long vane 52. Each of these U-shaped vane is provided with generally trapezoidally shaped ends 56 (FIG. 1) which are suitably apertured. The end portion 56 disposed adjacent to the rear wall 35 of the forward portion 12 of the housing receives a cap screw 44, the cap screw being received within a threaded aperture (no number) in the wall 35, the apertures being spaced an equal distance apart from each other. The distance between the apertures is such that the width of the bight portion of either vane is equal to or greater than the distance between the apertures. Similarly the rear end portion 56 of that vane which is disposed to the rear is also apertured and secured to the wall 46 by means of a cap screw 44. The intermediate end portions are secured by means of a cap screw 58 which is disposed with the shank portion extending through aligned apertures in the adjacent end portions of the vanes, a nut 60 and a lock washer 62 being disposed over the threaded end portion of the cap screw 58.

The operation of the sprayer provided with applicant's novel vanes should be obvious. However it should be noted that the lower portion of the outlet 16 can be closed off entirely or partially. To partially close off the lower portion it is only necessary to turn one group of vanes 52, 54 into overlapping position. Partially closing the air outlet restricts the volume where it isn't needed and could do some damage in blowing fruit off the trees. The design of the divided directional vane is such that one section is about 40 percent as long as the outlet is wide. Thus the operator has a choice of closing off 40 percent, 60 percent, or all of the lower portion of the outlet. The spray nozzles 38 are disposed in such a manner that they will be disposed outwardly of that vane which is open. Thus, when it is desired to have the vanes 52 open they are disposed forwardly, and when it is desired to have the vanes 54 open the vanes 52 are disposed to the rear and the vanes 54 are disposed forwardly. When both vanes are entirely open or shut it does not matter which is forward of the other. It should also be noted that it is possible to close off an entire side of a sprayer when desired merely by turning to the overlapping position all the vanes on one side of the sprayer.

While the preferred structure in which the principles of the present invention have been incorporated is shown and described above it is to be understood that the invention is not to be limited to the particular details, shown and described above, but that, in fact, widely different means may be employed in the practice of the broader aspects of the invention. For example, it may be possible to secure the vanes to the housing at one end only.

What is claimed is:

1. A mobile sprayer adapted for movement past plants to be treated comprising means for creating and discharging an air blast in a plane extending transversely of the direction of travel of the sprayer, said means including a longitudinally extending cylindroidal housing having a transverse opening therein, means associated with said air blast creating and discharging means for introducing agricultural chemicals into the air blast, a plurality of longitudinally extending vane means adjustably secured at least at one end to said housing and extending across said opening for controlling said air blast, each of said vane means including aligned short and long vanes, one of said long and short vanes being adjustably secured at one end to said housing and the other of said long and short vanes being independently adjustable with respect to said one vane.

2. A mobile sparyer adapted for forward movement past plants to be treated comprising means for creating and discharging an air blast in a plane extending transversely of the direction of travel of the sprayer, said means including a longitudinally extending cylindroidal housing having a transverse opening therein, means associated with said air blast creating and discharging means for introducing agricultural chemicals into the air blast, longitudinally extending vane means connected to said housing and extending across said opening for controlling said air blast, said vane means including a plurality of upper vanes extending across said opening and being adjustably secured to said housing, and a plurality of lower vane means, said lower vane means including a forward vane adjustably secured at its forward end to said housing, a rear vane in longitudinal alignment with said forward vane, and means adjustably securing the rear end of the forward vane to the forward end of the rear vane, one of said forward and rear vanes being longer than the other.

3. A mobile sprayer comprising: a generally cylindroidal housing adapted to be moved forward longitudinally past plants to be treated, said housing being provided with a transverse opening, a blower mounted within said housing and adapted to impel air through said opening, means to introduce spray material into the air impelled through said opening, said means being mounted on said housing, and a plurality of upper and lower longitudinally extending vane means extending across said opening and secured in substantially equally spaced apart relationship to said housing for adjustable rotational movement, said lower vane means including a forward vane adjustably secured at its forward end to said housing, a rear vane in longitudinal alignment with said forward vane, and means adjustably securing the rear end of the forward vane to the forward end of the rear vane, each vane being formed of a U-shaped member having a generally flat bight portion whose transverse width is not less than said spaced apart relationship.

References Cited by the Examiner

UNITED STATES PATENTS

| 2,216,413 | 10/1940 | Jones | 98—110 X |
| 2,641,504 | 6/1953 | Robinson | 239—78 |
| 2,670,566 | 3/1954 | Tuft | 239—78 X |
| 2,828,158 | 3/1958 | Patterson | 239—78 |
| 3,088,676 | 5/1963 | Nottingham | 239—78 |
| 3,218,952 | 11/1965 | Gygax | 98—36 |

FOREIGN PATENTS 672,041 5/1952 Great Britain.

M. HENSON WOOD, Jr., *Primary Examiner.*

V. C. WILKS, *Assistant Examiner.*